(12) United States Patent
Davis et al.

(10) Patent No.: US 11,660,997 B2
(45) Date of Patent: May 30, 2023

(54) VEHICLE TENT

(71) Applicant: Go Fast Campers LLC, Belgrade, MT (US)

(72) Inventors: Wiley Christopher Davis, Manhattan, MT (US); Brandon Keith Davey, Camarillo, CA (US)

(73) Assignee: Go Fast Campers LLC, Belgrade, MT (US)

( * ) Notice: Subject to any disclaimer, the term of this patent is extended or adjusted under 35 U.S.C. 154(b) by 0 days.

(21) Appl. No.: 17/377,210

(22) Filed: Jul. 15, 2021

(65) Prior Publication Data

US 2022/0017008 A1 Jan. 20, 2022

Related U.S. Application Data

(60) Provisional application No. 63/052,901, filed on Jul. 16, 2020.

(51) Int. Cl.
*B60P 3/34* (2006.01)
*B60P 3/38* (2006.01)

(52) U.S. Cl.
CPC ............... *B60P 3/341* (2013.01); *B60P 3/38* (2013.01)

(58) Field of Classification Search
CPC ............ B60P 3/341; B60P 3/38; E04H 15/06
USPC ....................................................... 296/160
See application file for complete search history.

(56) References Cited

U.S. PATENT DOCUMENTS

| 3,411,819 | A |   | 11/1968 | Tyree et al. |                |
|-----------|---|---|---------|--------------|----------------|
| 3,603,330 | A |   | 9/1971  | Halldorson et al. |           |
| 3,685,061 | A | * | 8/1972  | Wray ......... | B60P 3/38 52/63 |
| 3,785,693 | A | * | 1/1974  | Fulton ....... | B60P 3/38 296/160 |
| 3,924,365 | A | * | 12/1975 | Orberg ....... | B60P 3/38 52/63 |

(Continued)

FOREIGN PATENT DOCUMENTS

DE 3046211 * 7/1982

OTHER PUBLICATIONS

"Best way to make a soft top pop up?", Expedition Portal, downloaded from https://expeditionportal.com/forum/threads/best-way-to-make-a-soft-top-pop-up.169587/ on Feb. 12, 2021, believed to have published before Jul. 16, 2020.

(Continued)

*Primary Examiner* — Joseph D. Pape
(74) *Attorney, Agent, or Firm* — Knobbe Martens Olson & Bear, LLP

(57) ABSTRACT

Disclosed herein are embodiments of roof top tent systems that can have an upper portion and a lower portion attached to the upper portion along a first end portion of the upper and lower portions, at least one hinge that can extend along a length of a first end of the tent system, and a first structural panel in the lower portion of the tent system. In some embodiments, the at least one hinge can hingedly attach the upper portion to the lower portion of the tent system and/or can comprise a flap or web of material that extends from the upper portion of the tent system to the lower portion of the tent system. The at least one hinge can include and/or be made from a fabric material.

25 Claims, 12 Drawing Sheets

(56) References Cited

U.S. PATENT DOCUMENTS

| | | | |
|---|---|---|---|
| 5,544,671 A * | 8/1996 | Phillips | B60P 3/341 135/88.14 |
| 6,394,531 B2 | 5/2002 | Thompson et al. | |
| 8,182,020 B2 | 5/2012 | Herndon | |
| 10,086,684 B1 | 10/2018 | Stamm | |
| 10,829,028 B2 | 11/2020 | Delgadillo | |
| 2019/0202333 A1 | 7/2019 | Delgadillo | |
| 2019/0352924 A1 * | 11/2019 | Currid | B60P 3/38 |

OTHER PUBLICATIONS

"Hondo Garage's New Thing", Tacoma World, downloaded from https://www.tacomaworld.com/threads/hondo-garages-new-thing.516490/ on Feb. 12, 2021, believed to have published before Jul. 16, 2020.

"Roninjiro aluminum Nissan D40 camper", Expedition Portal, downloaded from https://expeditionportal.com/forum/threads/roninjiro-aluminum-nissan-d40-camper.100864/page-6 on Feb. 12, 2021, believed to have published before Jul. 16, 2020.

"Lightweight Homebuilt Camper for my Tacoma", Expedition Portal, downloaded from https://expeditionportal.com/forum/threads/lightweight-homebuilt-camper-for-my-tacoma.95671/page-11 on Feb. 12, 2021, believed to have published before Jul. 16, 2020.

H2UBE Keder Welt—4MM, Rochford Supply, downloaded from https://rochfordsupply.com/shop/awning/hardware/h2ube_Keder_Welt_-_4_mm/index.html on Feb. 12, 2021, believed to have published before Jul. 16, 2020.

GFC Platform Camper product details from web.archive.org/web/20171223042450/https://www.gofastcampers.com dated Dec. 11, 2017.

Screenshots of "Bigfoot Country: The Adventures of Woody and the Blue Ox" video hosted on Vimeo at https://vimeo.com/86202138, believed to have published before Jul. 16, 2020.

U.S. Appl. No. 17/535,192, filed Nov. 24, 2021, Vehicle Tent.

* cited by examiner

VEHICLE TENT

PRIORITY CLAIM AND INCORPORATION BY REFERENCE

The present application claims the benefit under 35 U.S.C. § 119(e) to U.S. Patent Application No. 63/052,901, filed on Jul. 16, 2020, the contents of which is hereby incorporated by reference herein in its entirety as if fully set forth herein for all purposes. Any and all applications for which a foreign or domestic priority claim is identified in the Application Data Sheet as filed with the present application are hereby incorporated by reference herein in their entirety and made a part of this specification.

FIELD OF THE DISCLOSURE

Embodiments of the present disclosure relate to tents for camping, for example, tents configured for use on a vehicle's rooftop.

BACKGROUND

Car camping is a very popular activity. But, with limited ground space in most campsites and the desire to be isolated from wet and/or cold surfaces, there is a benefit to having a tent on the top surface of a vehicle. Conventional roof top tents can have a hard shell and due to the nature of the product can be a high cost item (often ten or more times as expensive as a standard tent). Conventional roof top tents can also be heavy, which can be acceptable in use, but is expensive to ship to a retail location or end user.

SUMMARY OF SOME EXEMPLIFYING EMBODIMENTS

The systems, methods and devices of this disclosure each have several innovative aspects, implementations, or aspects, no single one of which is solely responsible for the desirable attributes disclosed herein.

Disclosed herein are embodiments of roof top tent systems that can have an upper portion and a lower portion attached to the upper portion along a first end portion of the upper and lower portions, at least one hinge that can extend along a length of a first end of the tent system, and a first structural panel in the lower portion of the tent system. In any embodiments disclosed herein, the at least one hinge can comprise a first hinge at a first portion of the tent system and a second hinge at a second portion of the tent system, the second portion of the tent system being different than the first portion of the tent system. In some embodiments, the at least one hinge can comprise a first hinge at a first side of the tent system and a second hinge at a second side of the tent system, the second side of the tent system being opposite to the first side of the tent system. In some embodiments, the at least one hinge can hingedly attach the upper portion to the lower portion of the tent system and/or can comprise a flap or web of material that extends from the upper portion of the tent system to the lower portion of the tent system. Further, the tent system can be configured such that the upper portion can be rotated about the at least one hinge between a first position wherein the upper portion is substantially parallel to and adjacent to the lower portion and a second position wherein the upper portion is rotated away from the lower portion. Further, in any embodiments disclosed herein, the at least one hinge can include and/or be made from a fabric material.

Any embodiments of the devices and systems disclosed herein can include, in additional embodiments, one or more of the following features, components, and/or details, in any combination with any of the other features, components, and/or details of any other embodiments disclosed herein: wherein the at least one hinge comprises only the fabric material; wherein the upper portion and the lower portion comprise a fabric material; and/or wherein the upper portion of the tent system can have a fabric cover.

Structural Panels:

Any embodiments of the devices and systems disclosed herein can include, in additional embodiments, one or more of the following features, components, and/or details, in any combination with any of the other features, components, and/or details of any other embodiments disclosed herein: wherein the tent system can further have a second structural panel in the upper portion of the tent system; wherein the second structural panel can be removably positionable within an enclosure in the upper portion of the tent system; wherein the first structural panel can be removably positionable within the lower portion of the tent system; wherein the first structural panel can be removably positionable within an enclosure in the lower portion of the tent system; wherein the enclosure in the lower portion of the tent system can be made from a fabric material and has a flap or closure element to selectively close the enclosure; wherein at least one of the first structural panel and the second structural panel can have a honeycomb material that, in some embodiments, can be made from polypropylene; wherein at least one of the first structural panel and the second structural panel can have a honeycomb material that is not covered with a protective film; wherein at least one of the first structural panel and the second structural panel can have a honeycomb material that is covered at least partially with a protective film; and/or wherein the film can have polyester, polyethylene terephthalate, or another suitable material; and/or wherein at least one of the first structural panel and the second structural panel can have a honeycomb material that is covered at least partially with a fabric material.

Adjustable Tension Members:

In any embodiments disclosed herein, the tension members can have an adjustable length. For example and without limitation, the tension members can be telescopically adjustable. The tension members can have a securing element configured to selectively support the tension members at any desired length. For example, the tension members can have a first, outer member and a second, inner member that is slidable within the first, outer member so that the second, inner member is movable between a first, collapsed position and a second, extended position. The length of the tension member is greater in the second, extended position than in the first, collapsed position. In any embodiments disclosed herein, the first and/or second tension members can have a locking mechanism coupled with the first and/or second member that is movable between a first position wherein the locking mechanism prevents a movement of the second member relative to the first member and a second position wherein the locking mechanism permits a movement of the second member relative to the first member.

Accordingly, any embodiments of the devices and systems disclosed herein can include, in additional embodiments, one or more of the following features, components, and/or details, in any combination with any of the other features, components, and/or details of any other embodiments disclosed herein: wherein the tent system can have a first tension member and/or a second tension member positioned between the upper and lower portions of the tent system, configured to support the upper portion in the second position; wherein the first and/or second tension members are positioned at a second end portion of the upper and lower portions of the tent system; wherein the first and/or second tension members are movable between a first position and a second position; wherein a length of the first and/or second tension members can be greater in the second position than in the first position; wherein the first and/or second tension members have a first, outer member and a second, inner member that can be movable within the first, outer member between a first, collapsed position and a second, extended position; wherein a length of the tension member can be greater in the second, extended position than in the first, collapsed position; wherein the first and/or second tension members have a locking mechanism coupled with the first and/or second member that can be movable between a first position wherein the locking mechanism prevents a movement of the second member relative to the first member and a second position wherein the locking mechanism permits a movement of the second member relative to the first member; wherein the locking mechanism can be movable between the first position and the second position by twisting at least a portion of the locking mechanism about an axial centerline of the first and/or second tension member between a first rotational position and a second rotational position; wherein, when the locking mechanism can be in the second rotational position, the locking mechanism constricts a portion of the second member relative to the first member to prevent the second member from moving relative to the first member; wherein the locking mechanism is movable between the first position and the second position by rotating a lever of the locking mechanism between a first rotational position and a second rotational position; wherein, when the locking mechanism is in the second rotational position, the locking mechanism constricts a portion of the second member relative to the first member to prevent the second member from moving relative to the first member; and/or wherein the first and/or second tension members are made from aluminum, steel, carbon fiber, fiberglass, or other suitable materials or combinations thereof.

Walls and Doors:

Any embodiments of the devices and systems disclosed herein can include, in additional embodiments, one or more of the following features, components, and/or details, in any combination with any of the other features, components, and/or details of any other embodiments disclosed herein: wherein the tent system can have a front wall, a first side wall at a first side of the tent system, and a second side wall at a second side of the tent system; wherein the front wall, the first side wall, and the second side wall each comprise a fabric material; wherein the fabric material of the first side wall can be coupled with or integrally formed with the fabric material of the at least one hinge and the fabric material of the second side wall can be coupled with or integrally formed with the fabric material of the at least one hinge; wherein the tent system can have a selectively closeable front opening in the front wall, a selectively closable first opening in the first side wall, and/or a selectively closable second opening in the second side wall; wherein the front opening, the first opening, and/or the second opening can have a zipper and a cover for selectively closing the front opening, the first opening, and/or the second opening; wherein the tent system can have a zipper and a tie or a pocket on the front wall, the first side wall, and/or the second side wall for securing the cover of the front opening, the first opening, and/or the second opening; and/or wherein the front opening, the first opening, and/or the second opening can have a mesh screen.

Frame:

Any embodiments of the devices and systems disclosed herein can include, in additional embodiments, one or more of the following features, components, and/or details, in any combination with any of the other features, components, and/or details of any other embodiments disclosed herein: wherein the tent system can have at least one support member coupled with the lower portion and positioned below the lower portion of the tent system to reduce a deflection of the lower portion of the tent system when supporting a user thereon; wherein the at least one support member can be an aluminum structural member; wherein the at least one support member can be an aluminum structural member having a height of at least one inch; wherein the tent system can have at least two support members positioned below the lower portion of the tent system to reduce a deflection of the lower portion of the tent system when supporting a user thereon; wherein the tent system can have a fastening mechanism configured to selectively secure the at least one support member to a roof or a rack of a vehicle; wherein the at least one support member can be configured to slidably receive a clamping nut to secure the at least one support member to a roof or a rack of a vehicle; wherein the at least one support member can be configured to slidably receive a sliding scissor type clamp to secure the at least one support member to a roof or a rack of a vehicle; and/or wherein the tent system can have a strap to selectively secure the at least one support member to a roof or a rack of a vehicle.

General Components:

Any embodiments of the devices and systems disclosed herein can include, in additional embodiments, one or more of the following features, components, and/or details, in any combination with any of the other features, components, and/or details of any other embodiments disclosed herein: wherein the tent system can have a plurality of pieces of a fabric material that are sewn together and seam taped; wherein the tent system can have a plurality of straps and/or buckles configured to secure the tent system to a roof or a rack of a vehicle; wherein the tent system can have a plurality of straps and/or buckles configured to secure the upper portion to the lower portion; and/or wherein the straps and/or buckles can be tightened to reduce an overall height or thickness of the tent system when the upper portion of the tent system can be in the first position.

DETAILED DESCRIPTION OF SOME EXEMPLIFYING EMBODIMENTS

Figure 1:
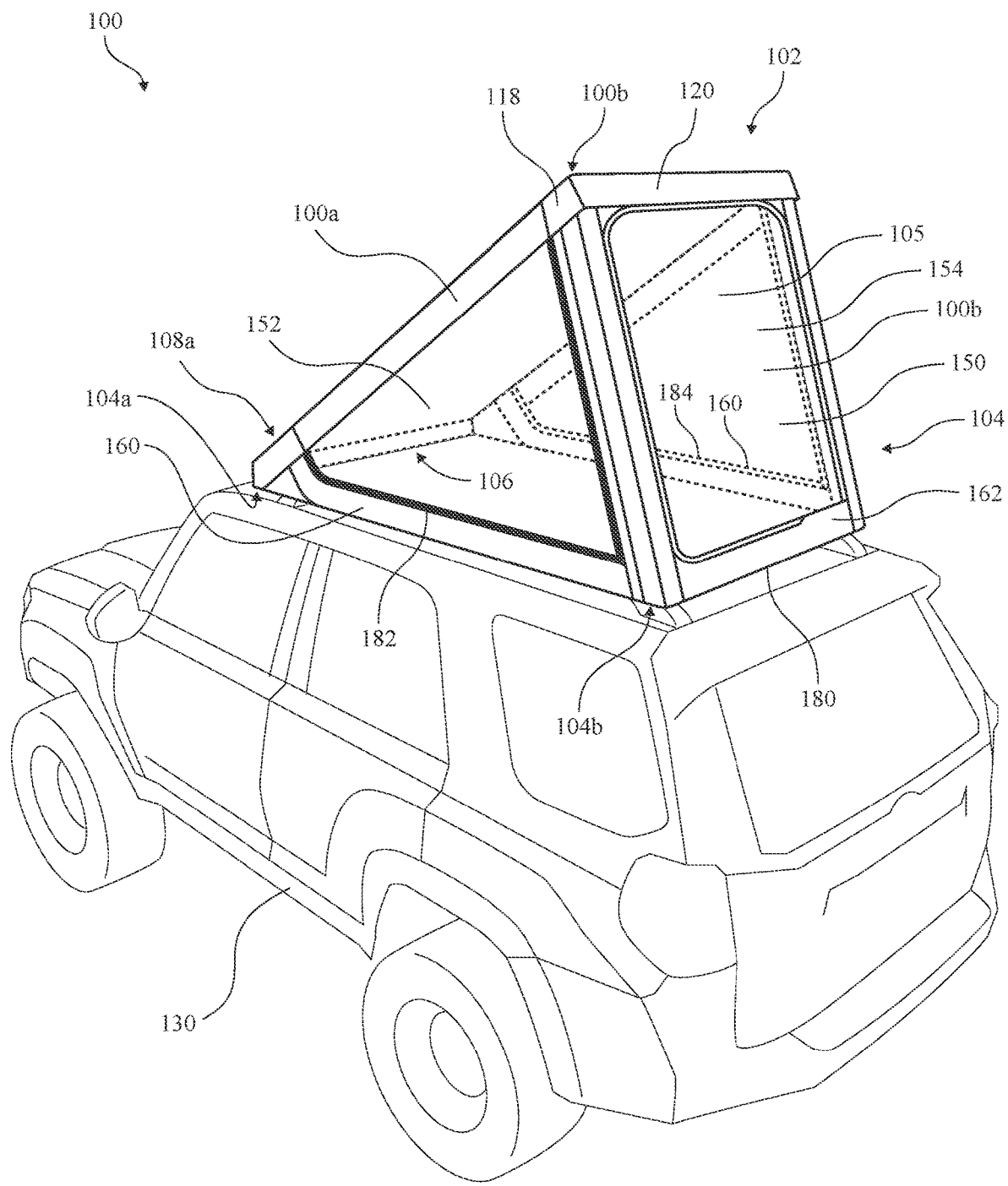
FIG. 1 shows a perspective view of an embodiment of a roof top tent system on a vehicle.
Figure 2:
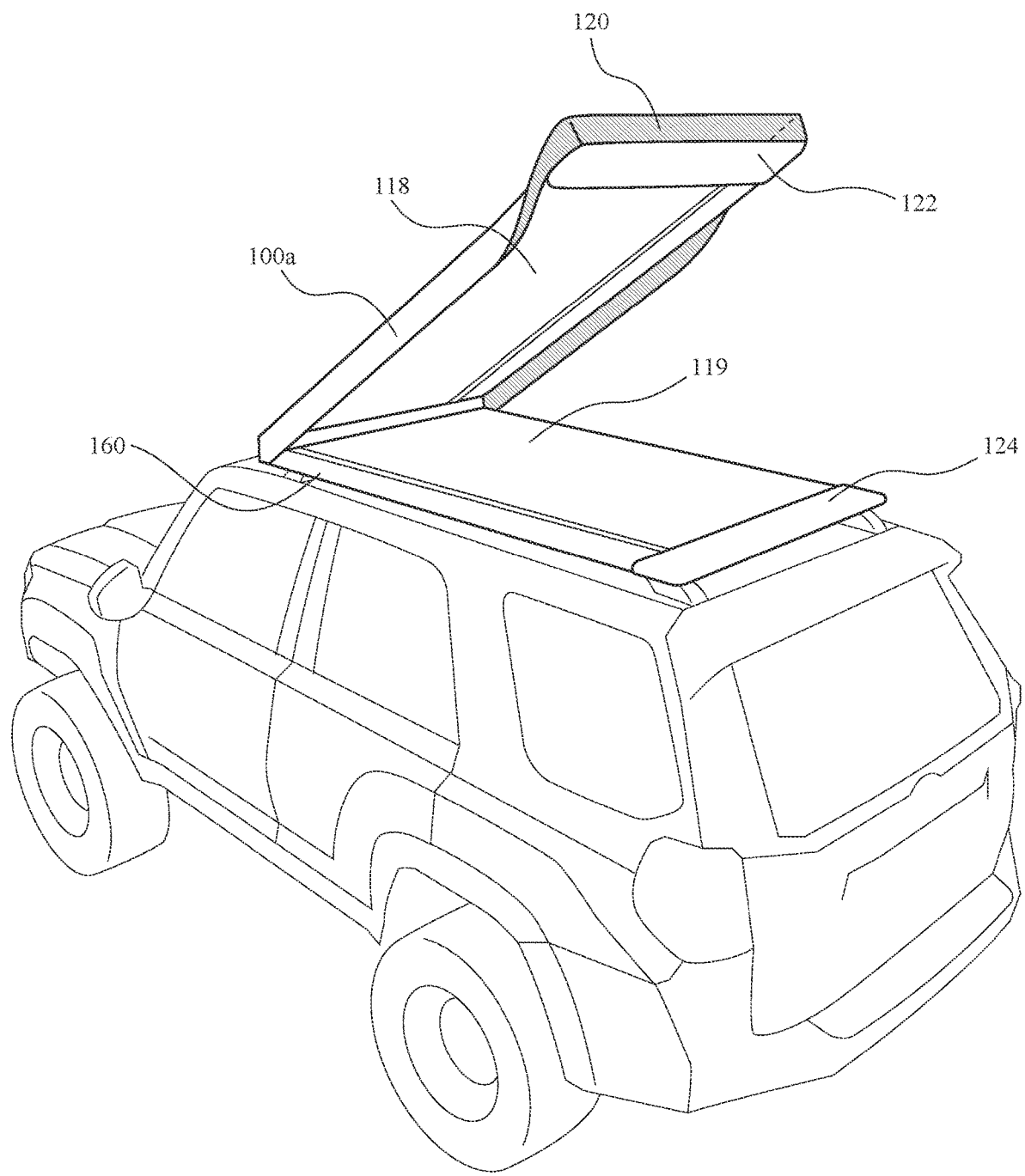
FIG. 2 shows a perspective view of the embodiment of the roof top tent system of FIG. 1 being moved toward a second, expanded state on a vehicle.
Figure 3:
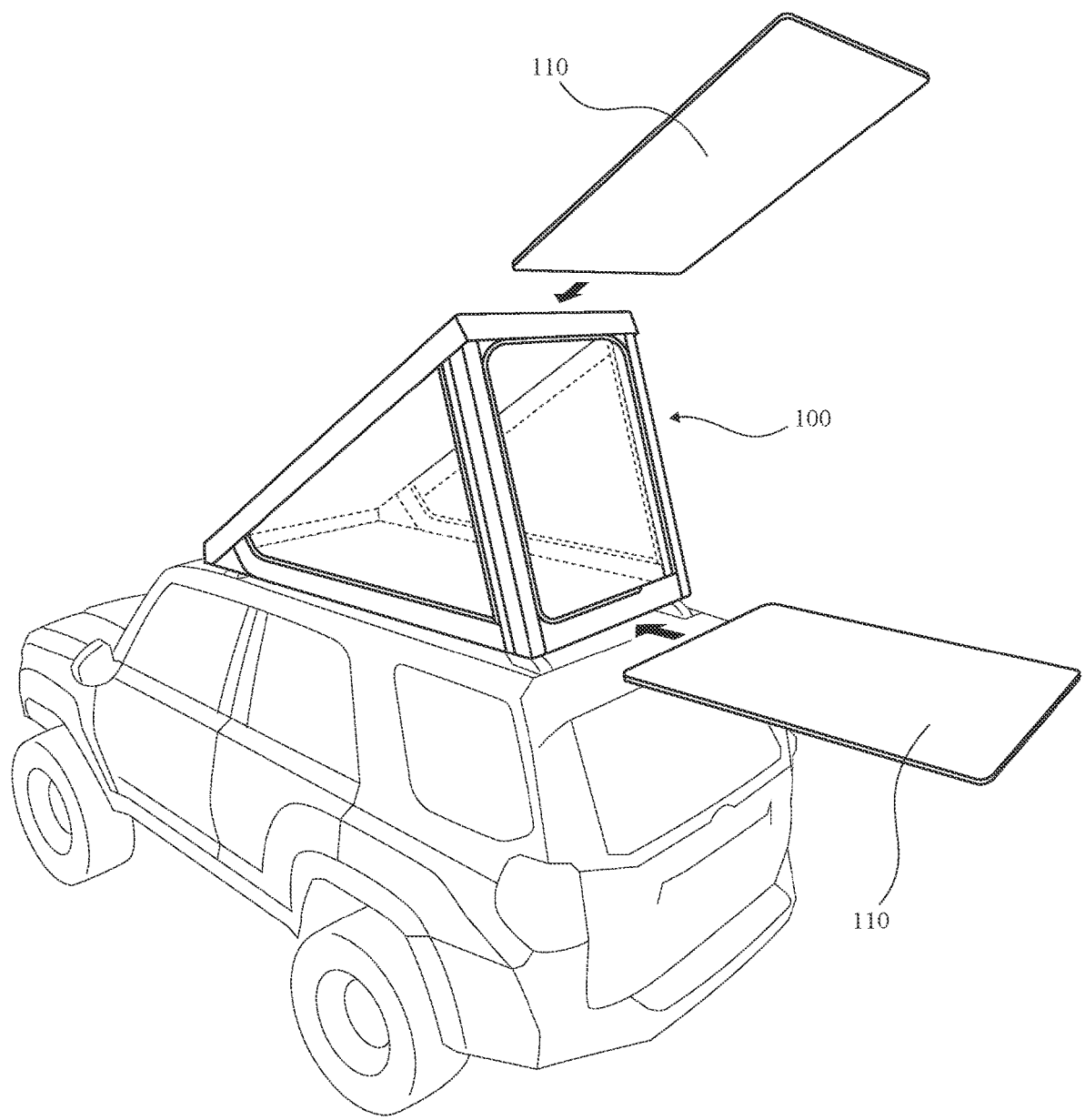
FIG. 3 shows a perspective view of the embodiment of the roof top tent system of FIG. 1 on a vehicle in a partially assembled state, showing the lower (first) and upper (second) structural panels being assembled with the tent system.
Figure 4:
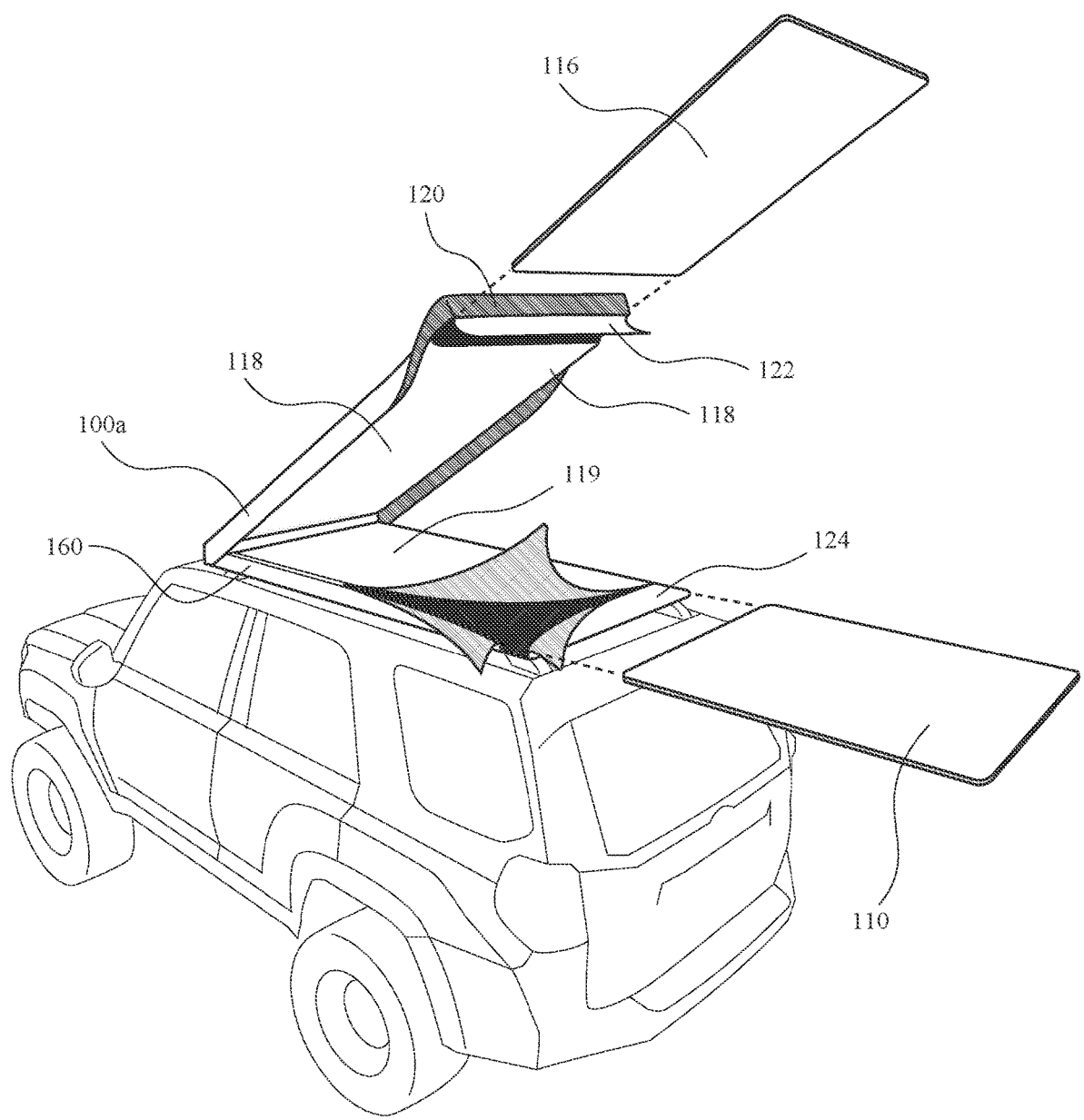
FIG. 4 shows a perspective view of the embodiment of the roof top tent system of FIG. 1 on a vehicle in a partially assembled state, showing the lower (first) and upper (second) structural panels being assembled with the tent system.

Described herein are embodiments of novel roof top tent systems. The embodiments of the tent systems disclosed herein provide an alternative to conventional hardshell roof top tents that are expensive and heavy. Using a fabric shell, fabric hinges, and/or lighter weight, one or more stiffened honeycomb structural panels for the upper portion and the lower portion of the tent system, as in some embodiments of the tent systems disclosed herein, can provide a high performance roof top tent at a lower cost and a lower weight to the vehicle and the user. Reducing the weight of the tent system can, in some embodiments, make the device easier to store, easier to lift onto the vehicle's roof top (which can be very high off the ground for vehicles such as SUV's, trucks, and vans), and easier to remove from the vehicle. It can also reduce the weight load on the vehicle, resulting in improved fuel efficiency and lower stresses on the vehicle's roof and/or rack system.

Some embodiments of roof top tent systems 100 disclosed herein can have an upper portion 102 and a lower portion 104 attached to the upper portion 102 along a first end portion 102a of the upper portion 102 and a first end portion 104a of the lower portion 104. As will be described below, any embodiments of the tent systems disclosed herein can be configured such that the upper portion of the tent system can move away from and/or rotate away from the lower portion of the tent system so as to create a space 105 within the tent system 100 (i.e., between the upper and lower portions of the tent system). For example and without limitation, one or more hinges 106 can be used to rotatably connect the upper portion 102 of the tent system 100 to the lower portion 104 of the tent system 100. In any embodiments disclosed herein, the at least one hinge 106 or one or more hinges 106 can include two or more hinges, or a first hinge at a first portion of the tent system 100 and a second hinge at a second portion of the tent system 100, the second portion of the tent system being different than the first portion of the tent system. Further, in any embodiments disclosed herein, the one or more hinges or the at least one hinge can comprise a first hinge at a first side of the tent system and a second hinge at a second side of the tent system, the second side of the tent system being opposite to the first side of the tent system. In any embodiments disclosed herein, the upper portion 102 can have a hard panel, cover, or shell, and/or the lower portion 104 can have a hard panel, cover, or shell.

Figure 5:
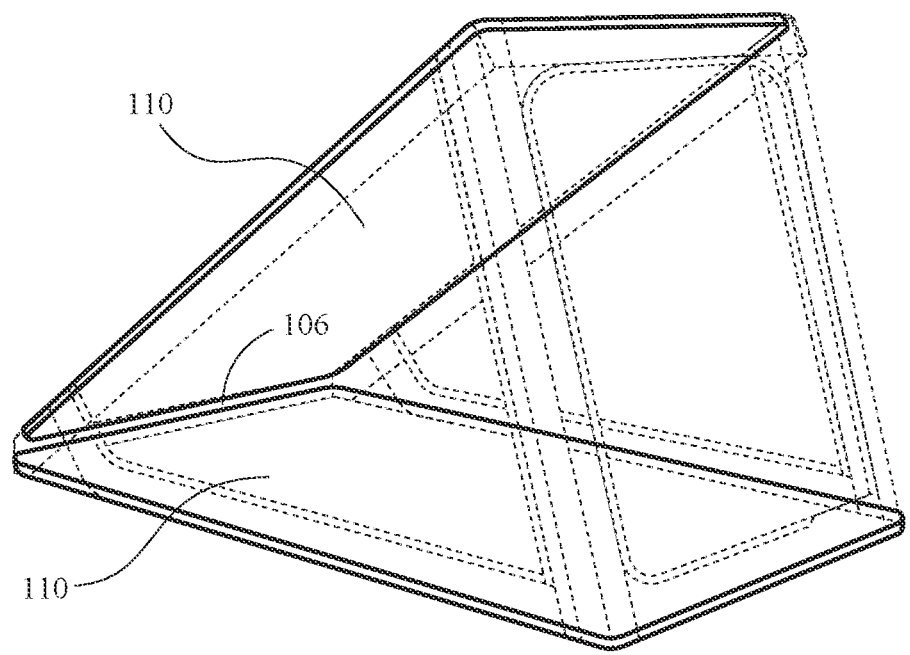
FIG. 5 shows a perspective view of the embodiment of the roof top tent system of FIG. 1.

In some embodiments, with reference to FIG. 5, the tent system 100 can have at least one hinge 106 (for example and without limitation, two or more hinges) to rotatably couple the upper portion 102 of the tent system to the lower portion 104 of the tent system 100. In any embodiments disclosed herein, the tent system 100 can have a first hinge at a first side 100a of the tent system 100 and a second hinge at a second side 100b of the tent system 100 to rotatably couple the upper portion 102 of the tent system to the lower portion 104 of the tent system 100, wherein the second side 100b of the tent system 100 is opposite to the first side 100a of the tent system 100. As mentioned, in any embodiments disclosed herein, at least one hinge 106 can hingedly attach the upper portion 102 to the lower portion 104. The tent system 100 can be configured such that the upper portion 102 can be rotated about the at least one hinge 106 between a first position wherein the upper portion 102 is substantially parallel to and adjacent to the lower portion 104 and a second position wherein the upper portion 102 is rotated away from the lower portion 104, to thereby create the space 105 that one or more users can occupy within the tent system. Further, in any embodiments disclosed herein, the at least one hinge 106 can comprise a fabric material. Further, in any embodiments disclosed herein, the at least one hinge 106 can have straps, webbing, or other adjustment mechanisms to adjust a height or an angle of rotation of the at least one hinge 106.

Use of the fabric material, compared with convention designs using a metal or traditional mechanical hinge components, reduces the overall cost of manufacturing the tent system, provides an integral solution that reduces the number of parts (moreover, reduces the number of mechanical parts) of the assembly, and reduces the overall weight of the assembly. Fabric hinges can also make the tent system easier to assemble for the owner of the tent system as compared to tents having rigid or mechanical hinges. Additionally, in some embodiments, the use of fabric for the hinges can permit the portion of the tent system at or near to the hinges to be expandable or deformable in a lateral direction, for example to accommodate a larger mattress or an inflatable mattress.

In any embodiments disclosed herein, the fabric used for the one or more hinges can be the same fabric that is used to cover the upper and lower portions 102, 104 of the tent system 100, as well as the first and second sides 100a, 100b of the tent system. In any embodiments disclosed herein, the at least one hinge can be 6 inches long (or approximately 6 inches long), or from 2 inches (or approximately 2 inches, or less than 2 inches) long to 10 inches (or approximately 10 inches, or more than 10 inches), or from 4 inches (or approximately 4 inches) long to 8 inches (or approximately 8 inches) long, or any values within these ranges or from or to any values or approximate values within these ranges. For example and without limitation, in any embodiments disclosed herein, the at least one hinge can include a length of fabric or other material that is 6 inches long (or approximately 6 inches long), or is from 2 inches (or approximately 2 inches, or less than 2 inches) long to 10 inches (or approximately 10 inches, or more than 10 inches), or is from 4 inches (or approximately 4 inches) long to 8 inches (or approximately 8 inches) long, or has a length of any values within these ranges or from or to any values or approximate values within these ranges.

In some embodiments, the fabric for the one or more hinges can be a different type of fabric than the fabric used to cover one or more of the other portions of the tent system 100, or can have supplemental fabric or other material, such as rubber, neoprene, or other suitable materials to reinforce, stiffen, protect, and/or cover the one or more hinges. Further, in any embodiments disclosed herein, the tent system can be configured such that the at least one hinge 106 comprises only the fabric material. In other embodiments, the tent system 100 can be configured such that the upper portion 102 and the lower portion 104 comprise a fabric material plus another material or component comprising a plastic or a metal. Additionally, as mentioned, some embodiments of the tent system 100 can be configured such that the one or more hinges comprise only the same fabric material as is used to cover the remaining portions of the tent system, including without limitation, the upper portion 102 the lower portion 104, the first side portion 100a, and/or the second side portion 100b of the tent system 100. In any embodiments disclosed herein, the tent system 100 can have multiple layers of the fabric.

Structural Panels:

In any embodiments disclosed herein, the tent system 100 can have a first or a lower structural panel 110 (also referred to herein as a first structural panel) positioned in or removably positionable in the lower portion 104 of the tent system 100. Additionally, in any embodiments disclosed herein, the tent system 100 can have a second or upper structural panel 111 in the upper portion 102 of the tent system 100. The upper structural panel 111 can be positioned within or removably positionable within an enclosure 118 in the upper portion 102 of the tent system 100. The enclosure 118 in the upper portion 102 of the tent system 100 can be made from a fabric material and can have a flap or closure element 122 to selectively close the enclosure 118. In some embodiments, the flap 122 and/or the enclosure 118 can have a securing element, such as a zipper, hook and loop connector, buttons, or other similar securing components, to selectively secure the flap or closure element 122 in the closed position and to substantially seal the opening to the enclosure 119. In some embodiments, the structural panels can be encapsulated in fabric covers.

Similarly, the lower structural panel 110 can be but is not required to be positioned within or removably positionable within the lower portion 104 of the tent system 100. For example and without limitation, the lower structural panel 110 can be removably positionable within an enclosure 119 in the lower portion 104 of the tent system 100. The enclosure 119 in the lower portion 104 of the tent system 100 can be made from a fabric material and can have a flap or closure element 124 to selectively close the enclosure 119. In some embodiments, the flap 124 and/or the enclosure 119 can have a securing element, such as a zipper, hook and loop connector, buttons, or other similar closure components, to selectively secure the flap or closure element 124 in the closed position and to substantially seal the opening to the enclosure 119. Additionally, in any embodiments disclosed herein, the fabric enclosures can be sized and/or configured to tightly fit the structural panels. This can ensure a tight, winkle free fit and high quality appearance that can also reduce the chance of the material flapping in the wind during travel and ensure that the structural panels are maintained in the most desired position.

The lower structural panel 110 can, in any embodiments disclosed herein, be thicker, stiffer and/or otherwise be configured to support the weight of one or a plurality of users in the tent system 100. For example, in some embodiments, the lower structural panel 110 can be configured to be stiff enough to support multiple, full grown adults lying on the lower structural panel 110 with no frame or support structure below the lower structural panel, or a minimal frame or support structure, or other frame or support structure (more rigid or otherwise) below the lower structural panel and maintain a substantially planar shape (i.e., exhibiting a deflection of less than or equal to 1 inch (or approximately 1 inch), or from ¼ inch (or approximately ¼ inch, or less than ¼ inch) to 2 inches (or approximately 2 inches, or more than 2 inches), or from or from ½ inch (or approximately ½ inch) to 1 inch (or approximately 1 inch), along a length of the lower structural panel 110.

In any embodiments disclosed herein, at least one or both of the lower structural panel 110 and the upper structural panel 111 can comprise or be made from a honeycomb material. In some embodiments, any of the structural panels or other structural support components can be made from a polypropylene or other polymer or composite honeycomb material. In some embodiments, at least one of the lower structural panel 110 and the upper structural panel 111 can have a honeycomb material that is not covered with a protective film. Further, in some embodiments, at least one of the lower structural panel 110 and the upper structural panel 111 can have a honeycomb material that is covered at least partially or is covered completely with a protective film. The film can be or can include polyester, polyethylene terephthalate, or another suitable material. In some embodiments, at least one of the lower structural panel 110 and the upper structural panel 111 can have or be made from a honeycomb material that is covered at least partially with a fabric material.

Figure 6:
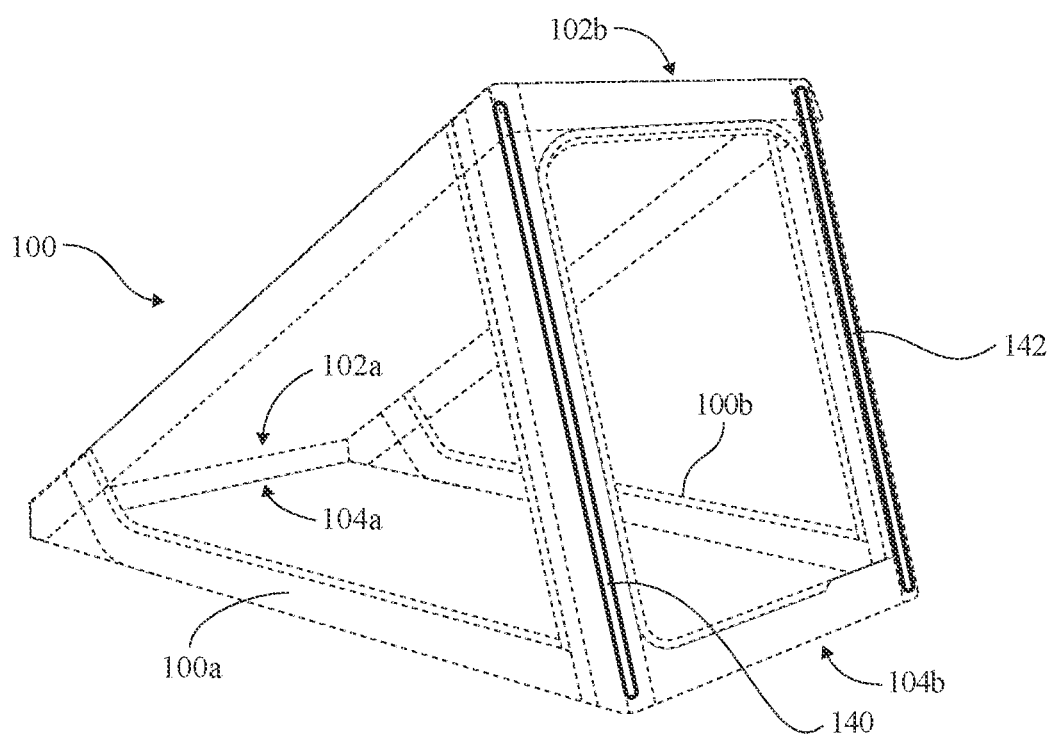
FIG. 6 shows another perspective view of the embodiment of the roof top tent system of FIG. 1.
Figure 7:
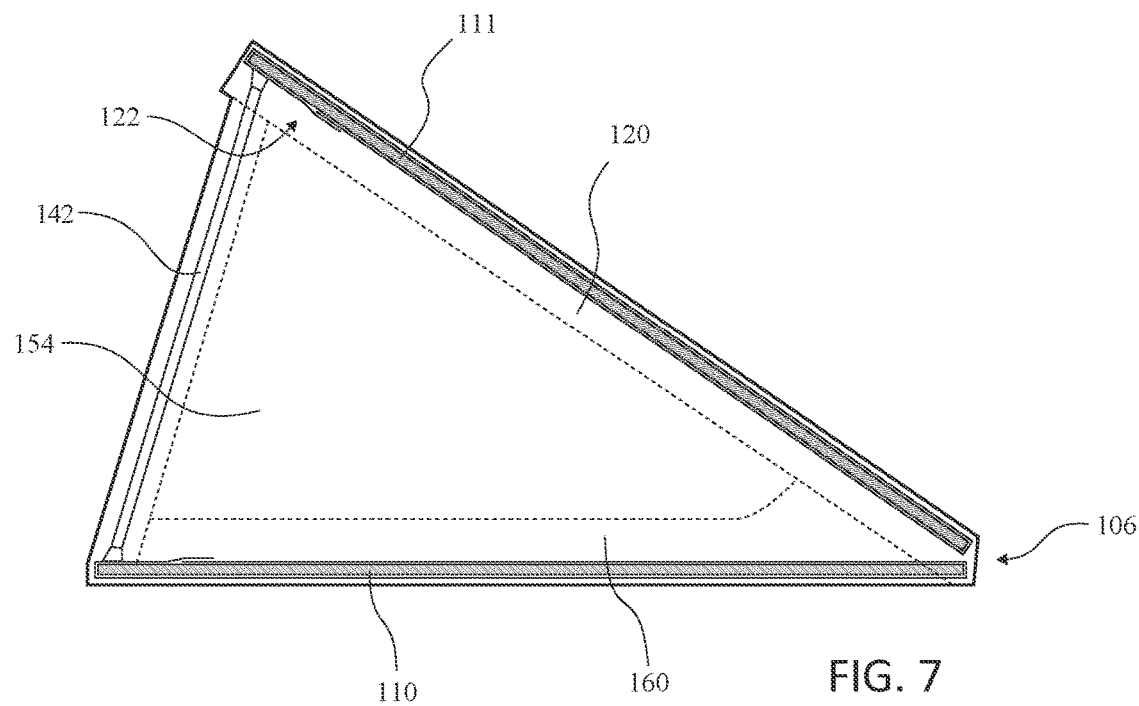
FIG. 7 shows a side view of the embodiment of the roof top tent system of FIG. 1, showing the tent system in a second state.
Figure 8:
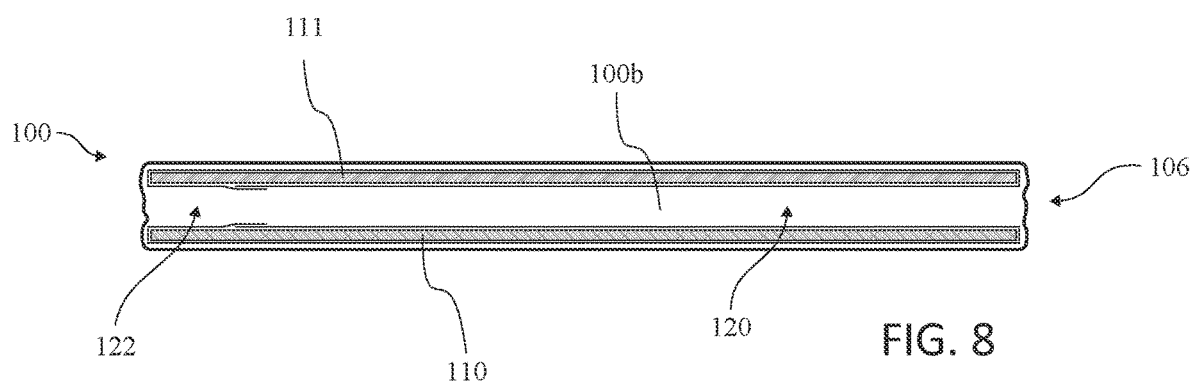
FIG. 8 shows a side view of the embodiment of the roof top tent system of FIG. 1, showing the tent system in a first state.
Figure 9:
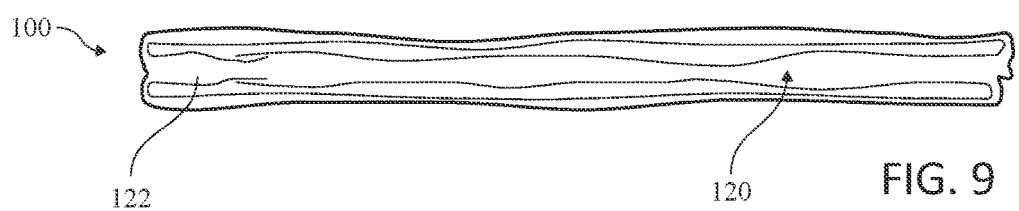
FIG. 9 shows another side view of the embodiment of the roof top tent system of FIG. 1.
Figure 10:
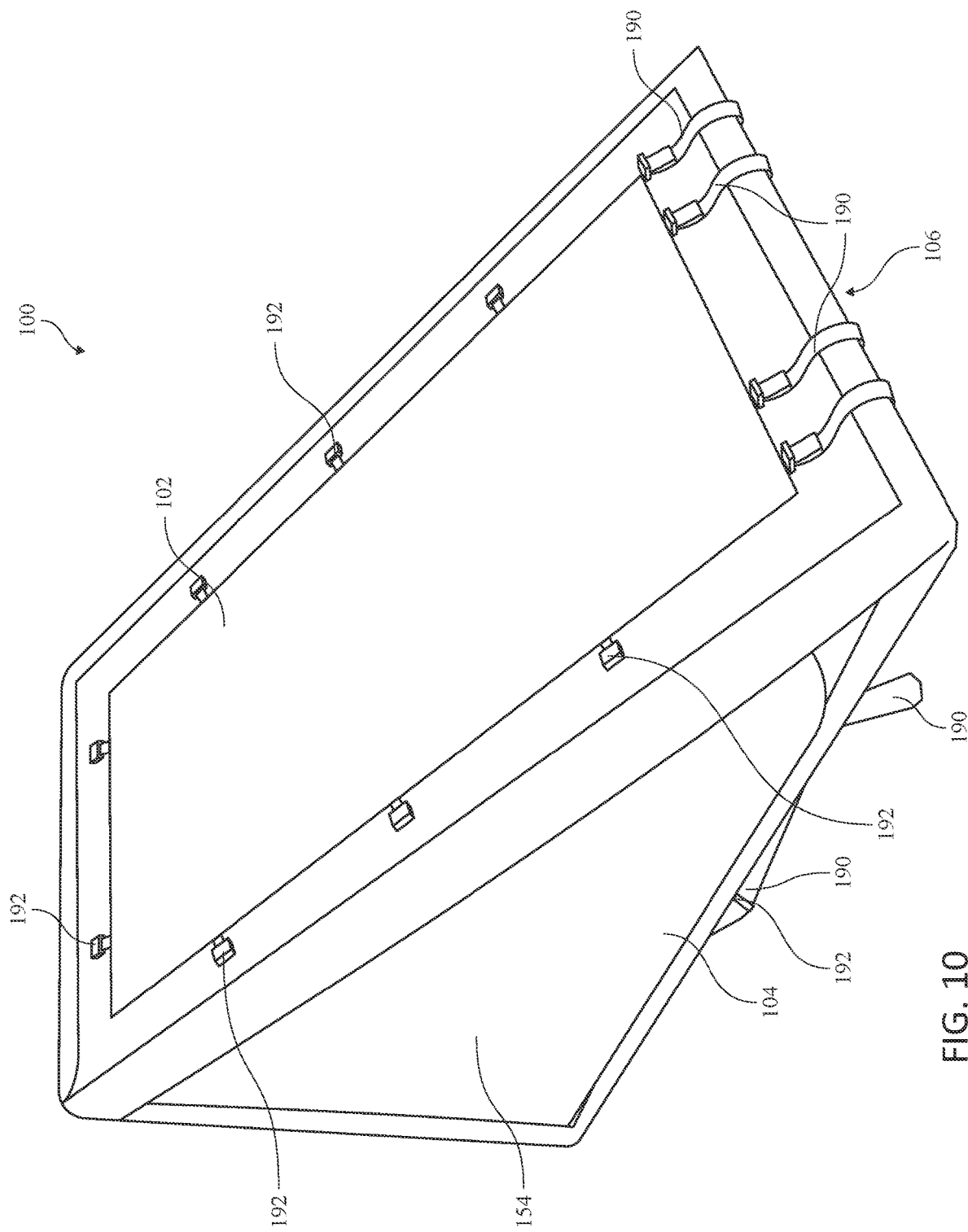
FIG. 10 shows another perspective view of the embodiment of the roof top tent system of FIG. 1.
Figure 11:
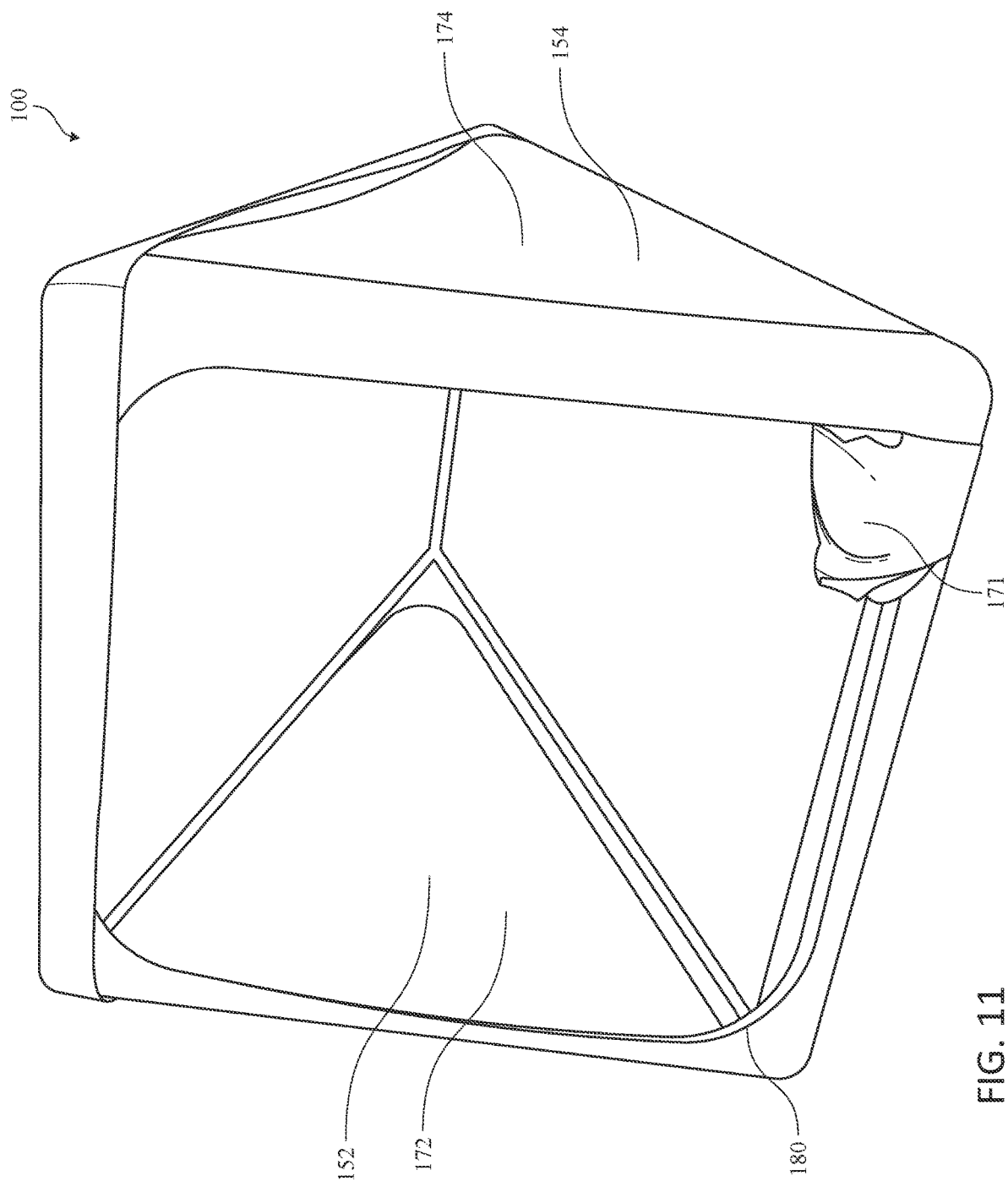
FIG. 11 shows another perspective view of the embodiment of the roof top tent system of FIG. 1.
Figure 12:
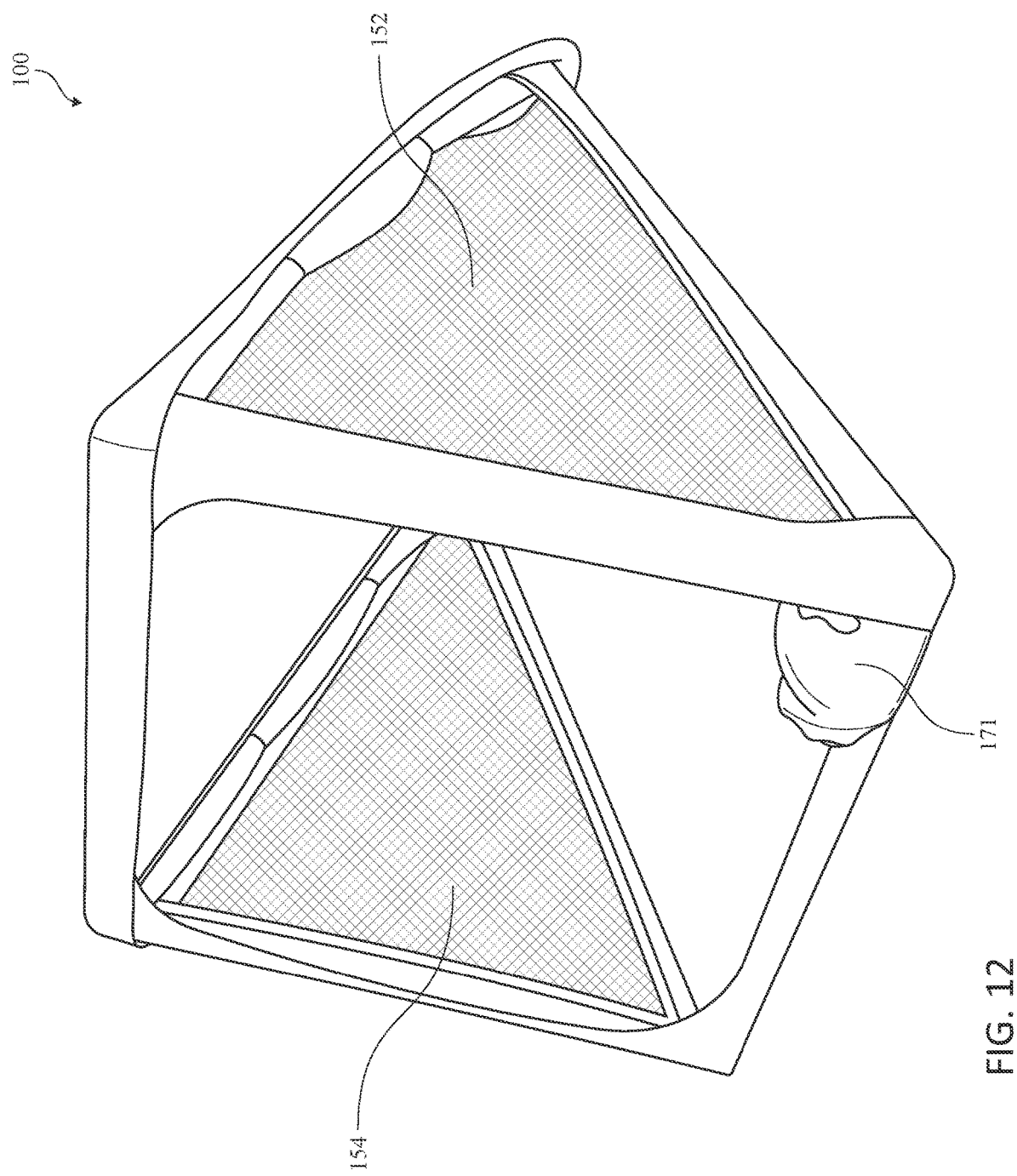
FIG. 12 shows another perspective view of the embodiment of the roof top tent system of FIG. 1.
Figure 13:
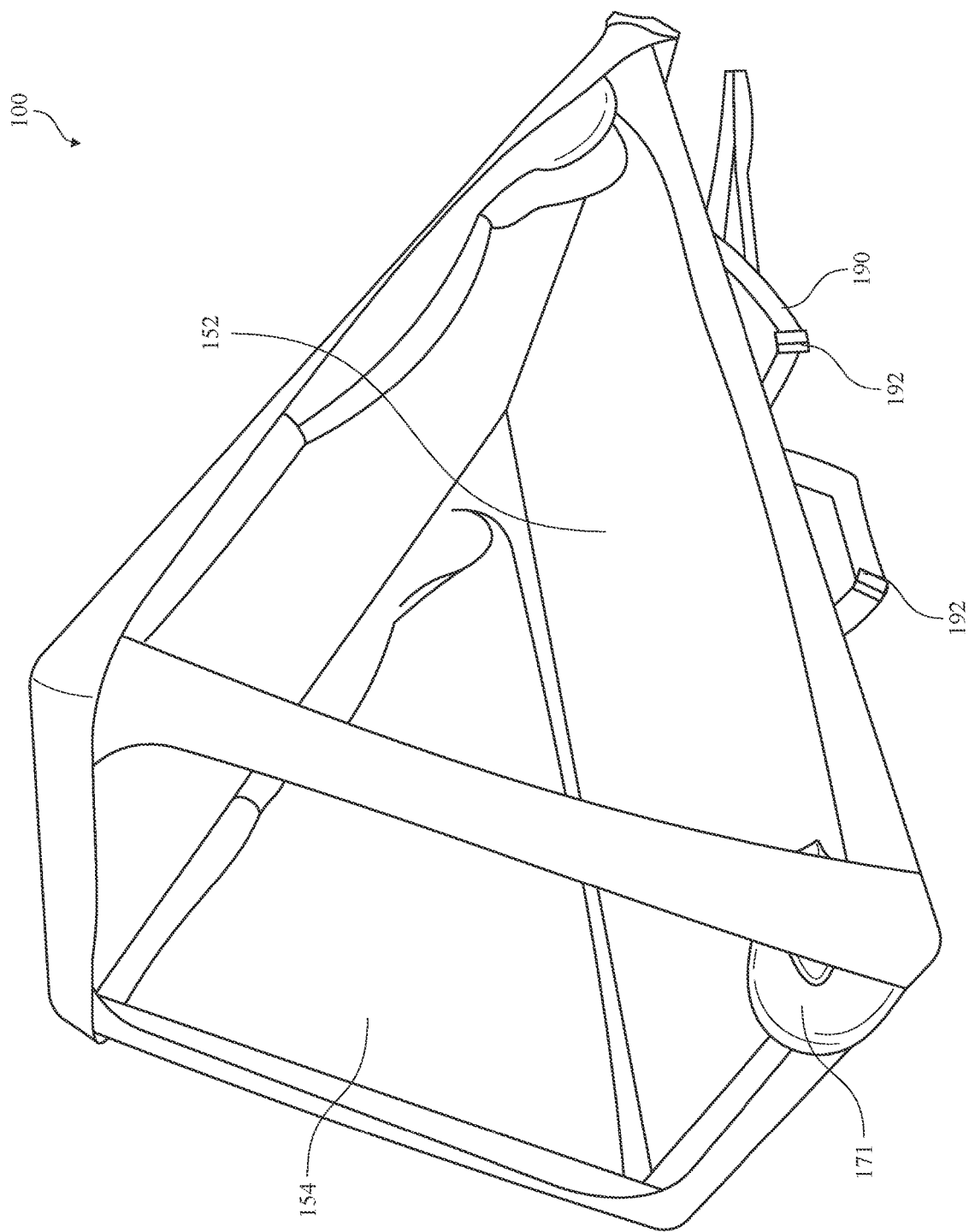
FIG. 13 shows another perspective view of the embodiment of the roof top tent system of FIG. 1.
Figure 14:
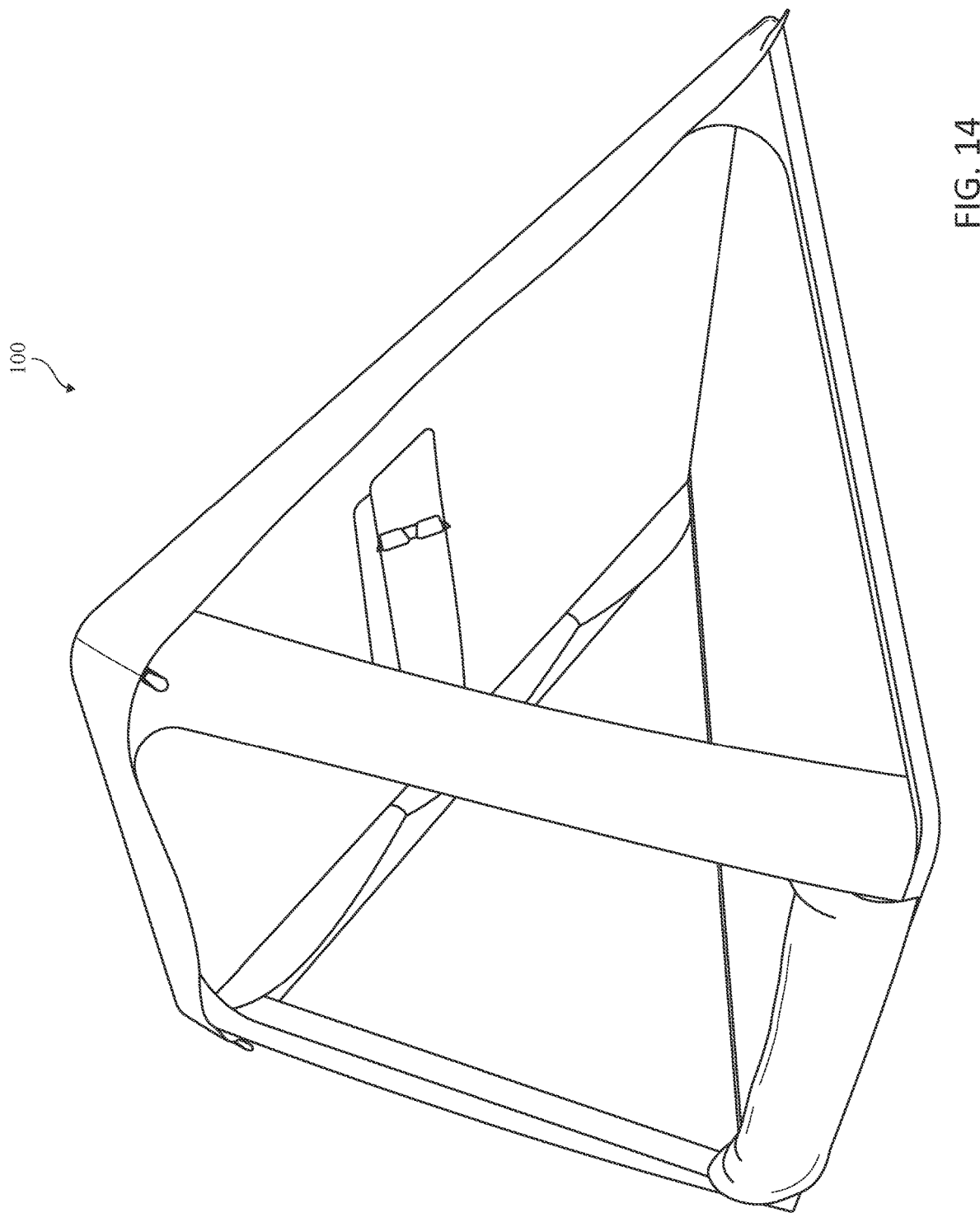
FIG. 14 shows another perspective view of the embodiment of the roof top tent system of FIG. 1.
Figure 15:
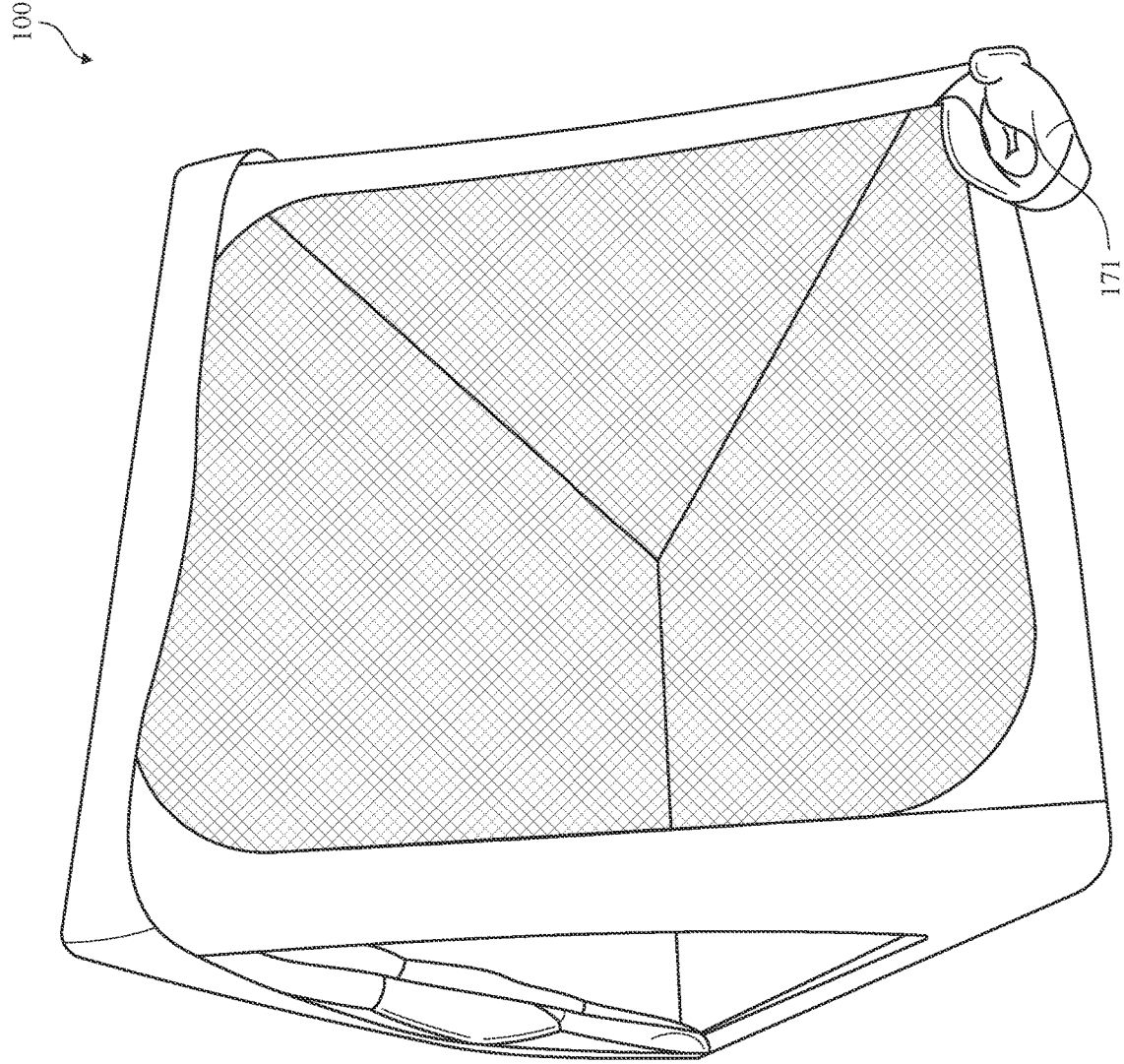
FIG. 15 shows another perspective view of the embodiment of the roof top tent system of FIG. 1.

Adjustable Tension Members:

Any embodiments of the devices and systems disclosed herein can include, in additional embodiments, one or more rigid and/or adjustable support members configured to support or maintain the tent system 100 in an open position wherein the upper portion 102 of the tent system 100 is rotated or moved away from the lower portion 104 of the tent system 100. For example, with reference to FIG. 6, any embodiments of the tent system 100 can have a first tension member 140 positioned adjacent to or removably positionable adjacent to a first side portion 100a of the tent system 100 and/or a second tension member 142 positioned adjacent to or removably positionable adjacent to a second side portion 100b of the tent system 100 to support or maintain the tent system 100 in an open position wherein the upper portion 102 of the tent system 100 is rotated or moved away from the lower portion 104 of the tent system 100.

In some embodiments, the one or more support members can be configured like a trekking pole that can extend in place and lock, including ones that have a twist lock mechanism. Further, in some embodiments, the one or more support members can have rubber tips or ends that can have flat, perpendicular ends. The rubber ends can be malleable and deformable.

In some embodiments, the support elements can be extended after the support elements have been positioned in the tent system relative to the upper portion and the lower portion of the tent system so as to tension the tent system. When the tent system is in the second, tensioned state, the side walls can be substantially extended.

The first tension member 140 can be positioned at any desired position along a length of the first side portion 100a of the tent system 100. Similarly, the second tension member 142 can be positioned at any desired position along a length of the second side portion 100b of the tent system 100. For example and without limitation, the illustrated embodiment has a first tension member 140 positioned adjacent to a second end portion 102b of the upper portion 102 of the tent system 100, and a second tension member 142 positioned adjacent to a second end portion 104b of the lower portion 104 of the tent system 100.

As mentioned, the first and/or second tensions members 140, 142 can be configured to support the upper portion 102 in the second, open position. In any embodiments disclosed herein, the first and/or second tension members 140, 142 can be movable between a first position and a second position, wherein a length of the first and/or second tension members 140, 142 is greater in the second position than in the first position. In some embodiments, the first and/or second tension members 140, 142 can have a first, outer member and a second, inner member (not shown) that can be movable within the first, outer member between a first, collapsed position and a second, extended position. Further, as mentioned, a length of the tension member can be greater in the second, extended position than in the first, collapsed position.

The first and/or second tension members 140, 142 can have a locking mechanism coupled with the first and/or second member that can be movable between a first position wherein the locking mechanism prevents a movement of the second member relative to the first member and a second position wherein the locking mechanism permits a movement of the second member relative to the first member such that, when the locking mechanism is in the second position, the first and/or second tension members 140, 142 will be axially rigid. In some embodiments, the locking mechanism can be movable between the first position and the second position by twisting at least a portion of the locking mechanism about an axial centerline of the first and/or second tension member between a first rotational position and a second rotational position wherein, when the locking mechanism can be in the second rotational position, the locking mechanism can constrict a portion of the second member relative to the first member to prevent the second member from moving (at least in the axial direction) relative to the first member. In some embodiments, the locking mechanism can be movable between the first position and the second position by rotating a lever of the locking mechanism between a first rotational position and a second rotational position wherein, when the locking mechanism is in the second rotational position, the locking mechanism constricts a portion of the second member relative to the first member to prevent the second member from moving relative to the first member. In any embodiments disclosed herein, the first and/or second tension members can be made from aluminum, steel, carbon fiber, fiberglass, or other suitable materials or combinations thereof.

In some embodiments, the fabric or flexible shell covering one or more portions of the tent system 100 can be configured to be selectively and removably attachable to the support members, including the first and/or second tension members 140, 142. This can be done, for example and without limitation, using clips, straps, hook and loop patches or tabs, or using any other suitable fasteners or components.

Walls and Doors:

Any embodiments of the tent systems and systems disclosed herein can include a front wall 150 that extends between the second end portion 102b of the upper portion 102 of the tent system 100 and the second end portion 104b of the lower portion 104 of the tent system 100. The tent system 100 can also have a first side wall 152 at a first side 100a of the tent system 100, and a second side wall 154 at a second side 100b of the tent system 100. In some embodiments, the front wall 150, the first side wall 152, and the second side wall 154 can each comprise a fabric material, wherein the fabric material can be the same as or different than the materials covering other portions of the tent system 100. In some embodiments, the fabric material of the first side wall 152 can be coupled with or integrally formed with the fabric material of the at least one hinge 106 and/or the fabric material of the second side wall 154 can also be coupled with or integrally formed with the fabric material of the at least one hinge 106.

In any embodiments disclosed herein, the tent system 100 can have a selectively closeable front opening 170 in the front wall 150, a selectively closable first opening 172 in the first side wall 152, and/or a selectively closable second opening 174 in the second side wall 154. In any embodiments disclosed herein, a door 171 or opening 170 in the front wall 150 can be openable using a zipper 180 or other fastener components or mechanisms. The shape of the door 170 of the front wall 150 can be Q shaped to provide greater versatility in the opening style. The door or opening 172 in the first side wall 152 can be openable using a zipper 182 or other fastener components or mechanisms. The shape of the door or opening 182 of the first side wall 152 can be triangular to maximize the size of the door or opening 182. The door or opening 174 in the second side wall 154 can be openable using a zipper 184 or other fastener components or mechanisms. The shape of the door or opening 184 of the second side wall 154 can also be triangular to maximize the size of the door or opening 184. As described, the front opening 170, the first opening 172, and/or the second opening 174 can have a zipper and a cover (such as being made from a rain flap material) for selectively closing the front opening 170, the first opening 172, and/or the second opening 174. Further, in any embodiments disclosed herein, the tent system 100 can have one or more ties or pockets on the front wall, the first side wall, and/or the second side wall for securing the cover and/or the mesh screens of the front opening, the first opening, and/or the second opening.

Frame:

Any embodiments of the devices and systems disclosed herein can include, in additional embodiments, one or more of the following features, components, and/or details, in any combination with any of the other features, components, and/or details of any other embodiments disclosed herein: wherein the tent system 100 can have at least one support member coupled with the lower portion 104 and positioned below the lower portion 104 of the tent system 100 to reduce a deflection of the lower portion 104 of the tent system 100 when supporting a user thereon; wherein the at least one support member can be an aluminum structural member; wherein the at least one support member can be an aluminum structural member having a height of at least one inch; wherein the tent system 100 can have at least two support members positioned below the lower portion 104 of the tent system 100 to reduce a deflection of the lower portion 104 of the tent system 100 when supporting a user thereon; wherein the tent system 100 can have a fastening mechanism configured to selectively secure the at least one support member to a roof or a rack of a vehicle; wherein the at least one support member can be configured to slidably receive a clamping nut to secure the at least one support member to a roof or a rack of a vehicle; wherein the at least one support member can be configured to slidably receive a sliding parallel clamp (also referred to as a scissors clamp) to secure the at least one support member to a roof or a rack of a vehicle; and/or wherein the tent system 100 can have a strap to selectively secure the at least one support member to a roof or a rack of a vehicle.

General Components:

In any embodiments disclosed herein, the tent system 100 can have a plurality of straps 190 and/or buckles 192 configured to secure the upper and lower portion of the tent system together, and/or secure the tent system 100 to a roof or a rack of a vehicle. In any embodiments disclosed herein, the tent system 100 can have a plurality of straps and/or buckles configured to secure the upper portion 102 to the lower portion 104, and/or wherein the straps and/or buckles can be tightened to reduce an overall height or thickness of the tent system 100 when the upper portion 102 of the tent system 100 is in the first position. Further, the straps and/or buckles can be adjusted to change the size of the tent structure, and/or adapt the tent structure to the presence or absence of internal components or items, such as a sleeping pad or mattress.

Fabric and Mesh Materials:

In any embodiments disclosed herein, the fabric used to cover any portions of the tent system can be a 600D solution dye polyester fabric, for example with a film made from a PVC material or a non-P PVC film or other durable, tear resistant, waterproof, water resistant, and/or very UV resistant material. In any embodiments disclosed herein, one or more portions of the tent system, including for example and without limitation, the upper portion 102 of the tent system, can be covered with a medium duty or heavy duty rubberized material.

For example and without limitation, the material of the flap portion 120 on the upper portion 102 and/or the flap portion 124 of the lower portion 104 can be made from a 300D polyester, a 420D nylon, or other suitable material. Further, the flap or closure element 122 of the enclosure 118 and/or the flap or closure element 124 of the enclosure 119 in the lower portion 104 of the tent system 100 can be made from a 300D polyester, a 420D nylon, or other suitable material. Any portions of the tent system 100 can be reinforced with additional materials, additional layers of materials, additional stitching, or otherwise. In any embodiments, the plurality of pieces of a fabric material of the tent system 100 can be sewn together and seam taped.

Additionally, in any embodiments disclosed herein, one or more of the wall portions can be made from a lighter weight material and can include a mesh material, such as a 75D polyester mesh material. Further, one or more of the wall portions can be also have a more dense cover material that can selectively cover the mesh material, and can be unzipped and/or rolled up to expose the mesh material. The cover material can include or be made from a 300D polyester with honeycomb ripstop, and can have a TPU film covering, or any other suitable tent material. The lower portion 104 can be in a tub configuration, for example having a side bottom tub components 160, front bottom tub components or portions 162, and/or other material that ascends upward when the tent system is in the second or expanded state. The tub fabric and/or other fabric of the lower portion 104 can include or be made from a 300D polyester with honeycomb ripstop, and can have a TPU film covering, or any other suitable tent material.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree. The ranges disclosed herein also encompass any and all overlap, sub-ranges, and combinations thereof, and any specific values within those ranges. Language such as "up to," "at least," "greater than," "less than," "between," and the like includes the number recited. Numbers and values used herein preceded by a term such as "about" or "approximately" include the recited numbers. For example, "approximately 7 mm" includes "7 mm" and numbers and ranges preceded by a term such as "about" or "approximately" should be interpreted as disclosing numbers and ranges with or without such a term in front of the number or value such that this application supports claiming the numbers, values and ranges disclosed in the specification and/or claims with or without the term such as "about" or "approximately" before such numbers, values or ranges such, for example, that "approximately two times to approximately five times" also includes the disclosure of the range of "two times to five times." The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A roof top tent system, comprising:
an upper portion and a lower portion attached to the upper portion along a first end portion of the upper and lower portions;
at least one hinge extending along at least a portion of the first end portion of the upper and lower portions; and
a first structural panel in the lower portion of the tent system;
wherein:
the at least one hinge hingedly attaches the upper portion to the lower portion;
the tent system is configured such that the upper portion can be rotated about the at least one hinge between a first position wherein the upper portion is substantially parallel to and adjacent to the lower portion and a second position wherein the upper portion is rotated away from the lower portion;
the at least one hinge comprises a fabric material; and
the upper portion and the lower portion comprise a fabric material.

2. The roof top tent system of claim 1, wherein the at least one hinge comprises only the fabric material, which fabric material may include stitching.

3. The roof top tent system of claim 1, wherein the tent system further comprises a second structural panel in the upper portion of the tent system.

4. The roof top tent system of claim 3, wherein the second structural panel is removably positionable within an enclosure in the upper portion of the tent system.

5. The roof top tent system of claim 1, wherein the first structural panel is removably positionable within an enclosure in the lower portion of the tent system.

6. The roof top tent system of claim 1, wherein at least one of the first structural panel and a second structural panel in the upper portion of the tent system comprises a honeycomb material that is made from polypropylene or other polymer or composite material.

7. The roof top tent system of claim 1, comprising a first tension member and/or a second tension member positioned between the upper and lower portions of the tent system, configured to support the upper portion in the second position, wherein the first and/or second tension members are movable between a first position and a second position, wherein a length of the first and/or second tension members is greater in the second position than in the first position.

8. The roof top tent system of claim 1, wherein the rooftop tent system comprises only one hinge extending along at least the portion of the first end portion of the upper and lower portions and the only one hinge does not include any rigid components.

9. The roof top tent system of claim 1, wherein the tent system comprises a front wall, a first side wall at a first side of the tent system and a second side wall at a second side of the tent system, wherein the front wall, the first side wall, and the second side wall each comprise a fabric material, a selectively closeable front opening in the front wall, a selectively closable first opening in the first side wall, and/or a selectively closable second opening in the second side wall.

10. The roof top tent system of claim 9, wherein the fabric material of the first side wall is coupled with or integrally formed with the fabric material of the at least one hinge and the fabric material of the second side wall is coupled with or integrally formed with the fabric material of the at least one hinge.

11. The device of claim 1, comprising a layer of a honeycomb material in the lower portion of the rooftop tent system.

12. The roof top tent system of claim 1, comprising at least one support member coupled with the lower portion and positioned below the lower portion of the tent system to reduce a deflection of the lower portion of the tent system when supporting a user thereon, wherein the at least one support member is an aluminum structural member.

13. The roof top tent system of claim 1, comprising at least two support members positioned below the lower portion of the tent system to reduce a deflection of the lower portion of the tent system when supporting a user thereon.

14. The roof top tent system of claim 13, further comprising a plurality of straps and/or buckles or other fastening mechanism configured to selectively secure the at least one support member to a roof or a rack of a vehicle.

15. The roof top tent system of claim 1, comprising a plurality of straps and/or buckles configured to secure the upper portion to the lower portion.

16. A roof top tent system, comprising:
  an upper portion and a lower portion attached to the upper portion along a first end portion of the upper and lower portions;
  at least one hinge extending along at least a portion of the first end portion of the upper and lower portions; and
  a first structural panel in the lower portion of the tent system;
  wherein:
    the at least one hinge hingedly attaches the upper portion to the lower portion;
    the tent system is configured such that the upper portion can be rotated about the at least one hinge between a first position wherein the upper portion is substantially parallel to and adjacent to the lower portion and a second position wherein the upper portion is rotated away from the lower portion;
    the at least one hinge comprise a fabric material; and
    the upper portion of the tent system comprises a fabric cover.

17. The roof top tent system of claim 16, wherein the at least one hinge comprises only fabric or only fabric and stitching.

18. The roof top tent system of claim 16, wherein the first structural panel is removably positionable within an enclosure in the lower portion of the tent system and the second structural panel is removably positionable within an enclosure in the upper portion of the tent system.

19. The rooftop tent system of claim 16, wherein the rooftop tent system comprises only one hinge extending along at least the portion of the first end portion of the upper and lower portions and the only one hinge does not include any rigid components.

20. The rooftop tent system of claim 16, comprising a layer of a honeycomb material in the lower portion of the rooftop tent system.

21. A roof top tent system, comprising:
  an upper portion and a lower portion attached to the upper portion along a first end portion of the upper and lower portions;
  at least one hinge extending along at least a portion of the first end portion of the upper and lower portions;
  a first structural panel in the lower portion of the tent system; and
  at least two support members positioned below the lower portion of the tent system to reduce a deflection of the lower portion of the tent system when supporting a user thereon;
  wherein:
    the at least one hinge hingedly attaches the upper portion to the lower portion;
    the tent system is configured such that the upper portion can be rotated about the at least one hinge between a first position wherein the upper portion is substantially parallel to and adjacent to the lower portion and a second position wherein the upper portion is rotated away from the lower portion; and
    at least the at least one hinge comprises a fabric material.

22. The roof top tent system of claim 21, wherein the at least one hinge comprises only fabric or only fabric and stitching.

23. The roof top tent system of claim 21, wherein the first structural panel is removably positionable within an enclosure in the lower portion of the tent system and the second structural panel is removably positionable within an enclosure in the upper portion of the tent system.

24. The rooftop tent system of claim 21, wherein the rooftop tent system comprises only one hinge extending along at least the portion of the first end portion of the upper and lower portions and the only one hinge does not include any rigid components.

25. The rooftop tent system of claim 21, comprising a fastening mechanism configured to selectively secure the at least two support members to a roof or a rack of a vehicle.

* * * * *